3,254,232
MITIGATION OF STRAY IMPEDANCE EFFECTS IN HIGH FREQUENCY GATING
Charles J. N. Candy, Newark, N.J., assignor to Bell Telephone Laboratories, Incorporated, New York, N.Y., a corporation of New York
Filed Oct. 5, 1962, Ser. No. 228,632
10 Claims. (Cl. 307—88.5)

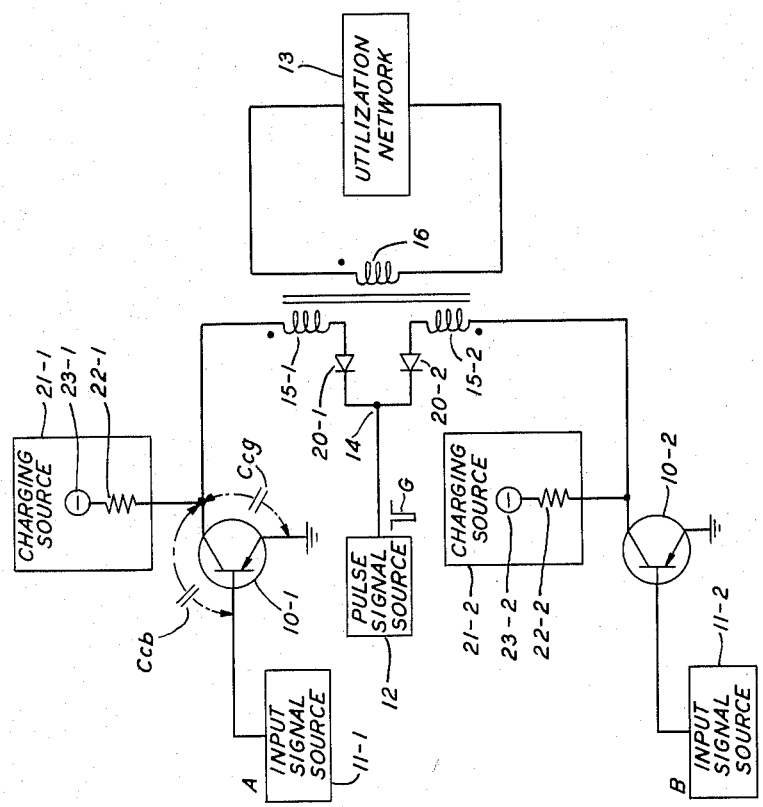

This invention relates to electric circuits, particularly logic circuits of the exclusive-OR variety.

Logic circuits are used for indicating selective conditions of various combinations of signals. One such condition is designated "exclusive-OR". It obtains when the presence of any of a multiplicity of signals is accompanied by the simultaneous absence of others. For two signals, the exclusive-OR condition prevails when either is present, but not both.

To indicate the condition of a logic circuit it is common practice to apply a gating signal to it. Where the gating is to be precise and to take place at a rapid rate, a gating signal is desirably of short duration. Unfortunately, a signal of this kind is adversely affected by stray impedance effects, such as those attributable to parasitic capacitance. The stray effects either bypass the gating signal, and prevent it from being operative, or delay its operation, with a consequent reduction in the rate at which the desired indication can be obtained. Often the stray effects can be tempered by separating the gating and logic functions, but this mitigates against the simplicity that is achieved by their coalescence.

Accordingly, it is an object of the invention to counter stray effects in electric circuits. A related object is to do so in a logic circuit coalescing gating and logic functions. A further object is to facilitate rapid gating in such a circuit.

To accomplish the foregoing and related objects, the invention provides for mitigating the stray impedance effects, for example, those of an energy storage variety, of various components incorporated into an electric circuit. When the stray effects are capacitive, this is accomplished by a charging source.

In a logic circuit whose load is energized through the transistor by controlling the impedance state of the latter, stray capacitance effects are eliminated by charging the capacitances and by isolating the charging and energizing sources.

More specifically, the invention is applicable to an exclusive-OR gate in which a transformer interconnecting two transistors is normally energized by a transformer applied gating signal only when an input signal is applied to either of the transistors, but not both. To prevent the gating signal from being bypassed by the stray capacitances associated with the transistors and transformer, the capacitances are charged by separate sources, and the gating and charging sources are isolated by diodes that are commonly poled with respect to the point where the gating signals are applied to the transistors.

Other aspects of the invention will become apparent after the consideration of an illustrative embodiment taken in conjunction with the figure which is a schematic diagram of a gated logic circuit in accordance with the invention.

In the figure, sensing elements 10–1 and 10–2, taking the form of PNP transistors, respond to input signals A and B from separate sources 11–1 and 11–2 and normally permit a gating signal G from a pulse source 12 to energize a utilization network 13 only for the condition that either of the signals A or B is present, but not both. Symbolically, this condition is $A\overline{B}+B\overline{A}$, i.e., A and not B or B and not A. The gating signal G is applied to the transistors 10–1 and 10–2 through the junction point 14 of two primary transformer windings 15–1 and 15–2 whose associated secondary winding 16 is directly connected to the utilization network 13. In addition, isolating diodes 20–1 and 20–2 are connected to the junction point 14 and separate charging sources 21–1 and 21–2 are connected to the transistors 10–1 and 10–2.

Disregarding for the moment the isolating diodes 20–1 and 20–2 and the charging sources 21–1 and 21–2, if a negative polarity input signal A or B is applied to either, but not both, of the transistors 10–1 or 10–2, the transistor, e.g., 10–1, sensing the input presents a low impedance path from its collector to its emitter. If a negative polarity gating signal G from the pulse source is of sufficient duration, it energizes the primary winding, e.g., 15–1, common to the transistor, e.g., 10–1, in the low impedance state. The other transistor, e.g., 10–2, with no applied input remains in its high impedance state and the primary winding, e.g., 15–2, common to it remains unenergized. On the other hand, if negative polarity input signals are applied to both transistors 10–1 and 10–2, placing them in low impedance states, both primary windings 15–1 and 15–2 become energized, but, when the transformer 15–1, 15–2 and 16 are connected according to the dot markings shown in the figure, there is cancellation of the induced signals in the secondary winding 16, so there is no response by the utilization network 13. Of course, if both transistors 10–1 and 10–2 are maintained in high impedance states because of the absence of input signals A and B, there is again no response by the utilization network 13. Hence, the circuit of the figure permits the coalescence of gating and exclusive-OR logic functions.

It is to be noted that since the polarity of the indication obtained at the secondary winding 16 depends upon which of the two transistors 10–1 or 10–2 is energized by an input signal, the utilization network 13 desirably includes a rectifier when the final indication is to be unipolar. Such a rectifier (not shown) is conveniently of the bridge type inasmuch as the inputs to the utilization network 13 are derived by way of a transformer coupling.

In the foregoing description of the exclusive-OR gate, excluding the operations of the isolating diodes 20–1 and 20–2 and the charging sources 21–1 and 21–2, it has been assumed that the gating signal is of sufficient duration." Otherwise, the stray capacitive effects associated with the transistors and the transformer windings can prevent the gating signal from being operative. But even when the gating signal is of significant duration, it ordinarily does not become operative until after an appreciable delay. This is because the stray capacitances, for example, the transistor capacitances between collector and ground $C_{cg}$ and between collector and base $C_{cb}$, along with other stray capacitances, including those of the transformer windings, serve to initially bypass the gating pulse. As a result, still assuming that the isolating diodes 20–1 and 20–2 and the charging sources 21–1 and 21–2 have been omitted, the gating pulse will initially produce either an erroneous or a delayed indication in the utilization network 13. If the stray capacitances are unbalanced, there will be an indication whether or not an input signal is applied to either transistor. If the stray capacitances are completely balanced, the indication will be delayed.

It is to be noted that the capacitance from collector to base $C_{cb}$ is more serious than capacitance from emitter or ground $C_{cg}$ because of the Miller effect by which the equivalent capacitance between collector and base of a transistor is substantially multiplied by the gain factor of the transistor. While the Miller capacitance effect can be eliminated, this typically requires separate gating circuitry and that the transistors be driven well beyond cutoff by base-applied signals of substantial magnitude. But even so, it is ordinarily difficult to gate the logic circuit with signals from the pulse source that do not endure for at least 60 nano, i.e., $60 \times 10^{-9}$, seconds.

Nevertheless, in keeping with the invention the stray capacitance effects are significantly reduced, as much as 10 fold to about 6 nanoseconds, without the requirement of either separate gating circuitry or applied signals of substantial magnitudes, by the use of the isolating diodes 20–1 and 20–2 and the separate charging sources 21–1 and 21–2. Each charging source 21–1 or 21–2 is conveniently constituted of a resistor 22–1 or 22–2 and a voltage source 23–1 or 23–2 of negative magnitude greater than that of the gating signal. Since the isolating diodes 20–1 and 20–2 connect the primary transformer windings 15–1 and 15–2 to the common point 14, they not only eliminate the effects of the transistor capacitances, but also the effects of the transformer capacitances. The charging sources 21–1 and 21–2 serve to maintain all of these capacitances in a charged condition. As a result, a short duration gating pulse applied at the common point 14 cannot be diverted in the fashion previously described. Thus, in the absence of an input signal at one of the transistors, e.g., 10–1, the gating voltage is counterbalanced by a charging voltage of greater magnitude so that the associated transformer winding, e.g., 15–1, is prevented from being energized and the gating and charging sources, e.g., 12 and 23–1, are isolated by a diode, e.g., 20–1. But, if a negative polarity input signal is applied at one of the transistors, e.g., 10–1, the collector of that transistor is placed at ground potential so that an applied gating pulse readily energizes the associated primary winding, e.g., 15–1. Consequently, a short duration gating signal rapidly produces the desired response by the utilization network 13 when an input signal A or B is applied to one of the transistors 10–1 or 10–2, but not both.

Related adaptation of the invention to circuits in general, and logic circuits in particular, will occur to those skilled in the art.

What is claimed is:

1. Apparatus comprising
   an active element accompanied by stray impedance effects,
   a load accompanied by stray impedance effects and connected to said active element,
   means for applying an auxiliary signal to said active element and said load, from which said signal is diverted by the stray impedance effects,
   means connected jointly to said active element and said load for reducing the stray impedance effects of said active element and said load, and
   means for isolating said reducing means from said applying means.

2. Apparatus as defined in claim 1 wherein the impedance stray effects are capacitive,
   and the reducing means comprises means for charging the capacitances of the capacitive stray effects.

3. Apparatus which comprises
   an active element exhibiting undesired storage effects associated with parasitic energy storage components and having a plurality of states,
   means for setting said active element in one of its states,
   a load connected to said active element, which load also exhibits undesired storage effects associated with parasitic energy storage components,
   means for energizing said load through said active element set in said one of its states,
   and means, connected jointly to said active element and said load for storing energy on said energy storage components to prevent said energy storage effects from interfering with the energizing of said load.

4. Apparatus comprising
   a switch exhibiting stray impedance effects,
   a load connected to said switch and also exhibiting stray impedance effects,
   means for operating said switch,
   means for applying a signal to said switch when operated through said load, said signal being diverted by said stray effects instead of acting through said switch,
   and means connected jointly to said switch and said load for reducing said stray effects with respect to said signal,
   thereby to allow said signal to act through said switch with reduced diversion by said stray effects.

5. Apparatus for the high-frequency sensing of the presence of an input signal, which comprises
   a transistor having a plurality of electrodes and exhibiting capacitance stray effects thereamong, one of which electrodes is coupled to the input signals, a third electrode of said transistor being connected to the applying means and said input signal a load exhibiting stray capacitance effects,
   means for applying an indicating signal to a second electrode of said transistor through said load,
   whereby the response of said transistor to said indicating signal is nominally governed by said input signal but at high frequencies is adversely affected by said stray capacitance effects,
   and means connected jointly to the second electrode of said transistor and said load, for charging the capacitors associated with said stray capacitance effects to prevent them from affecting the response of said transistor to said indicating signal.

6. Apparatus for providing an indication of the presence of an input signal at high frequencies, which comprises
   a transistor having emitter, base and collector electrodes and exhibiting interelectrode capacitance effects that electrically bypass the transistor, the bypassing effect being particularly significant at high frequencies,
   the input signal being applied between base and the emitter electrodes of said transistor,
   whereby said input signal produces a lowered impedance between the emitter and collector electrodes of said transistor,
   load means including means for isolating the load from said input signal, means interconnecting said emitter and collector electrodes through said load means for applying a pulse signal to said transistor,
   said pulse signal being characterized by a steep leading edge and thus being initially diverted from said transistor, in its lowered impedance condition, because of said interelectrode capacitance effects,
   and means interconnecting said emitter and collector electrodes for charging the capacitors associated with said capacitance effects,
   thereby to curtail the diversion of said pulse signal from said transistor.

7. Apparatus for the high-frequency gating of either, but not both, of two signals, which comprises
   a first transistor characterized by capacitance and responsive to one of the two signals,
   a second transistor characterized by capacitance and responsive to the other of the two signals,
   a load intercoupling the two transistors,
   means for gating said transistors through said load,
   means for charging the capacitances of said transistors and said load,
   and means for isolating the gating means from the charging means,
   thereby to prevent a high-frequency gating signal from being affected by said capacitances.

8. A gated logic circuit for indicating the exclusive-OR condition of two input signals comprising
   first and second transistors characterized by stray capacitance effects and having emitter, base and collector electrodes, the emitter electrodes being jointly connected to a point of common potential,
   first and second transformer windings respectively connected to the collector electrodes of said first and second transistors, means for extracting energy from said first and second transformer windings,
   first and second diodes connected to a junction point, said diodes interconnecting said first and second transformer windings, means for applying a gating signal to said junction point, means for applying one input signal to base electrode of said first transistor, means for applying the other input signal to the base electrode of said second transistor, means for applying a charging signal to the collector electrode of said first transistor, and means for applying another charging signal to the collector electrode of said second transistor, whereby the charging signals prevent the gating signal from being diverted from either of the transistors by said stray capacitance effects.

9. An electric circuit comprising a transistor having base, emitter and collector electrodes, a load having a plurality of terminals, one of which is connected to the collector electrode, means for applying a first signal to the base electrode of said transistor, a rectifying diode connected to the other terminal of said load, means interconnecting said rectifying diode with the emitter electrode of said transistor for applying a second signal thereto, and means connected to said collector electrode for applying a third signal to said transistor, the magnitude of said third signal being greater than that of said second signal.

10. Apparatus for the high frequency gating of either but not both of two signals, which comprises a first active element characterized by stray impedance effects and responsive to one of the two signals, a second active element characterized by stray impedance effects and responsive to the other of the two signals, a load interconnecting the active elements and characterized by stray impedance effects, means for gating said active elements through said load, means for energizing the stray impedances of said first active element and said load, means for energizing the stray impedances of said second active element and said load, and means for isolating the gating means from the energizing means.

References Cited by the Examiner

UNITED STATES PATENTS

| | | | |
|---|---|---|---|
| 2,785,305 | 3/1957 | Crooks et al. | 328—93 |
| 2,874,315 | 2/1959 | Reichert | 307—88.5 |
| 2,956,175 | 10/1960 | Bothwell | 307—88.5 |
| 2,987,627 | 6/1961 | Eckert | 307—88.5 |
| 2,989,664 | 8/1961 | Dewitch | 307—88.5 |
| 3,015,734 | 1/1962 | Jones | 307—88.5 |
| 3,020,420 | 2/1962 | Smee | 307—88.5 |
| 3,023,323 | 2/1962 | Kojalowicz | 307—88.5 |
| 3,050,641 | 8/1962 | Walsh | 307—88.5 |

OTHER REFERENCES

Digital Computer Components and Circuits, by Richards, November 1957, D. Van Nostrand Company, Inc., pages 48–54.

JOHN W. HUCKERT, *Primary Examiner.*

B. P. DAVIS, *Assistant Examiner.*